United States Patent
Cho

(10) Patent No.: US 8,009,370 B2
(45) Date of Patent: Aug. 30, 2011

(54) METHOD OF CONSTRUCTING PHYSICAL LENS BASED ON DEPTH-OF-FOCUS CHARACTERISTICS, AND LENS WITH EXTENDED DEPTH OF FOCUS CONSTRUCTED BY THE METHOD

(75) Inventor: Sung-nae Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 12/539,262

(22) Filed: Aug. 11, 2009

(65) Prior Publication Data

US 2010/0118419 A1    May 13, 2010

(30) Foreign Application Priority Data

Nov. 10, 2008   (KR) .................. 10-2008-0111002

(51) Int. Cl.
  *G02B 3/00*   (2006.01)
(52) U.S. Cl. ....................... 359/796; 359/724
(58) Field of Classification Search .................. 359/724, 359/796–797
  See application file for complete search history.

(56) References Cited

U.S. PATENT DOCUMENTS

| | | | |
|---|---|---|---|
| 4,898,461 A | 2/1990 | Portney | |
| 5,825,454 A | 10/1998 | Yamakaji et al. | |
| 6,302,540 B1 | 10/2001 | Katzman et al. | |
| 6,791,754 B2 | 9/2004 | Ogawa | |
| 2009/0279189 A1 | 11/2009 | Getman et al. | |

FOREIGN PATENT DOCUMENTS

| | | |
|---|---|---|
| JP | 10-068878 A | 3/1998 |
| JP | 2001-356304 A | 12/2001 |
| KR | 10-2001-0024989 A | 3/2001 |
| KR | 10-2009-0117399 A | 11/2009 |

*Primary Examiner* — Darryl J Collins
(74) *Attorney, Agent, or Firm* — Sughrue Mion, PLLC

(57) ABSTRACT

A method of constructing a physical lens based on depth of focus characteristics and an axially symmetric lens with an extended depth of focus constructed by the method are provided. An expression is deduced by substituting a depth of focus characteristic and a relation between vectors of arbitrary points on a lens surface into Snell's law, and partial differentiation is performed on the expression to yield a differential equation satisfied with arbitrary points on the lens surface. The differential equation is solved by, for example, numerical analysis to obtain a curve of an axially symmetric physical lens surface.

3 Claims, 21 Drawing Sheets

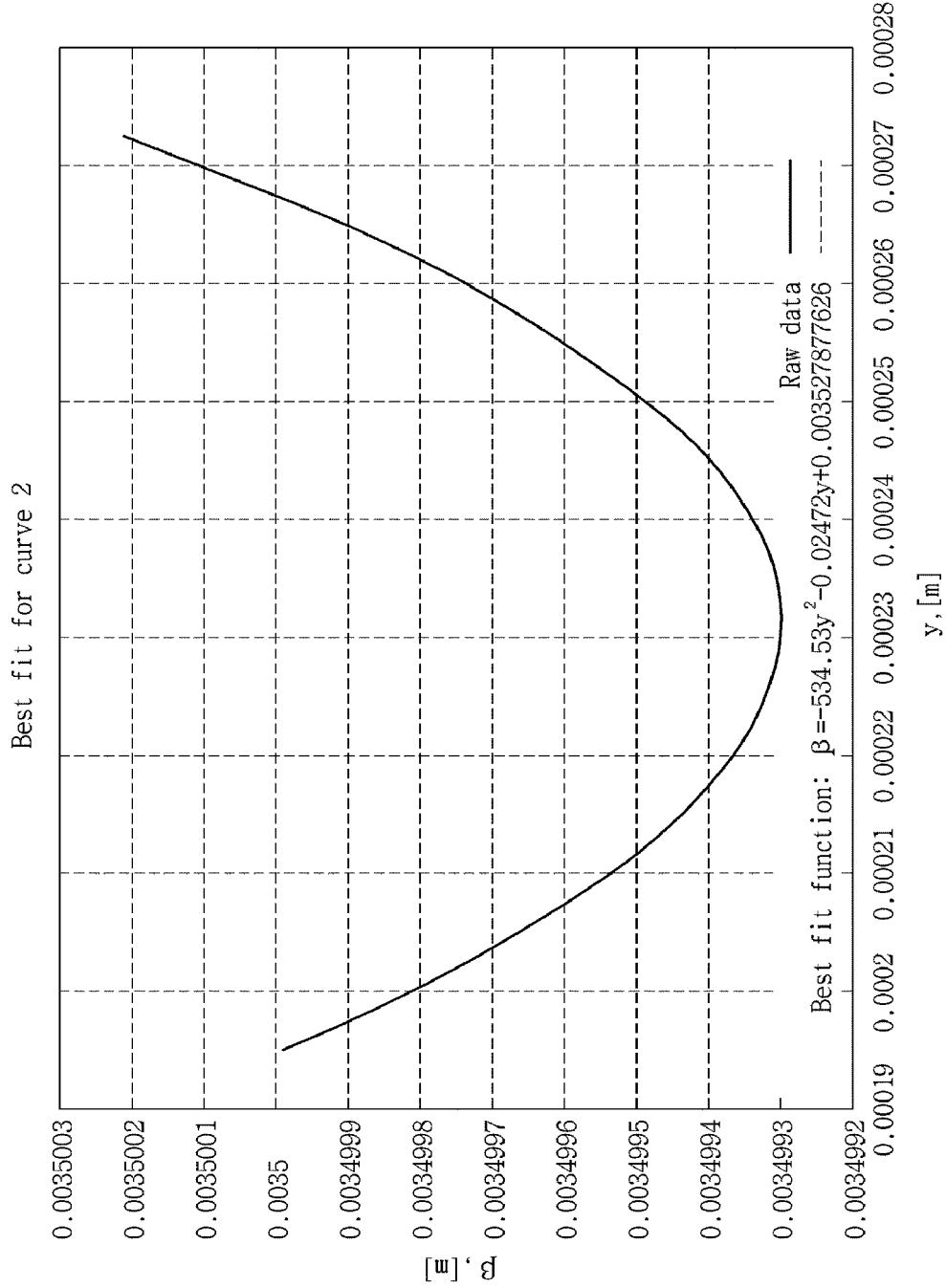

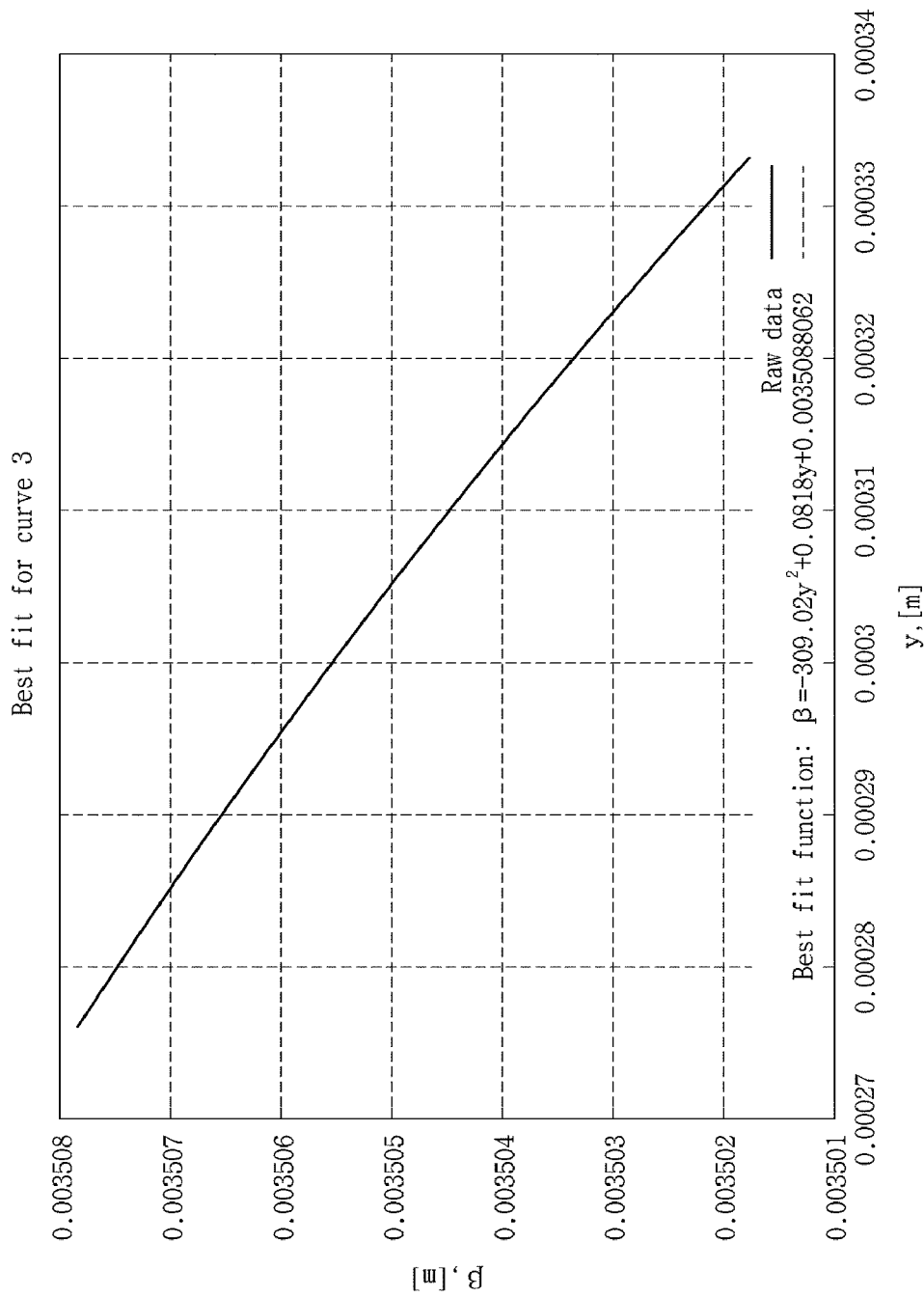

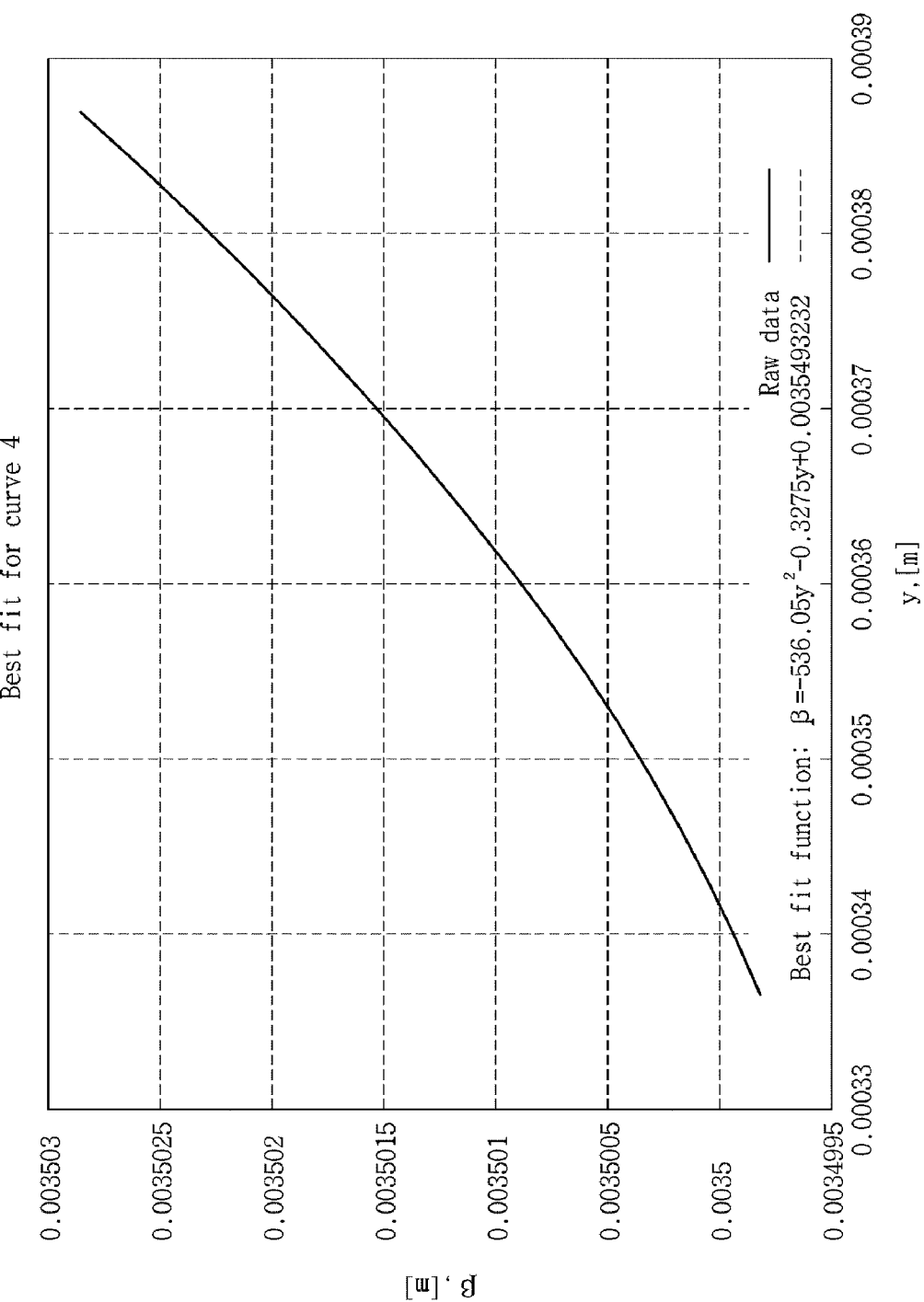

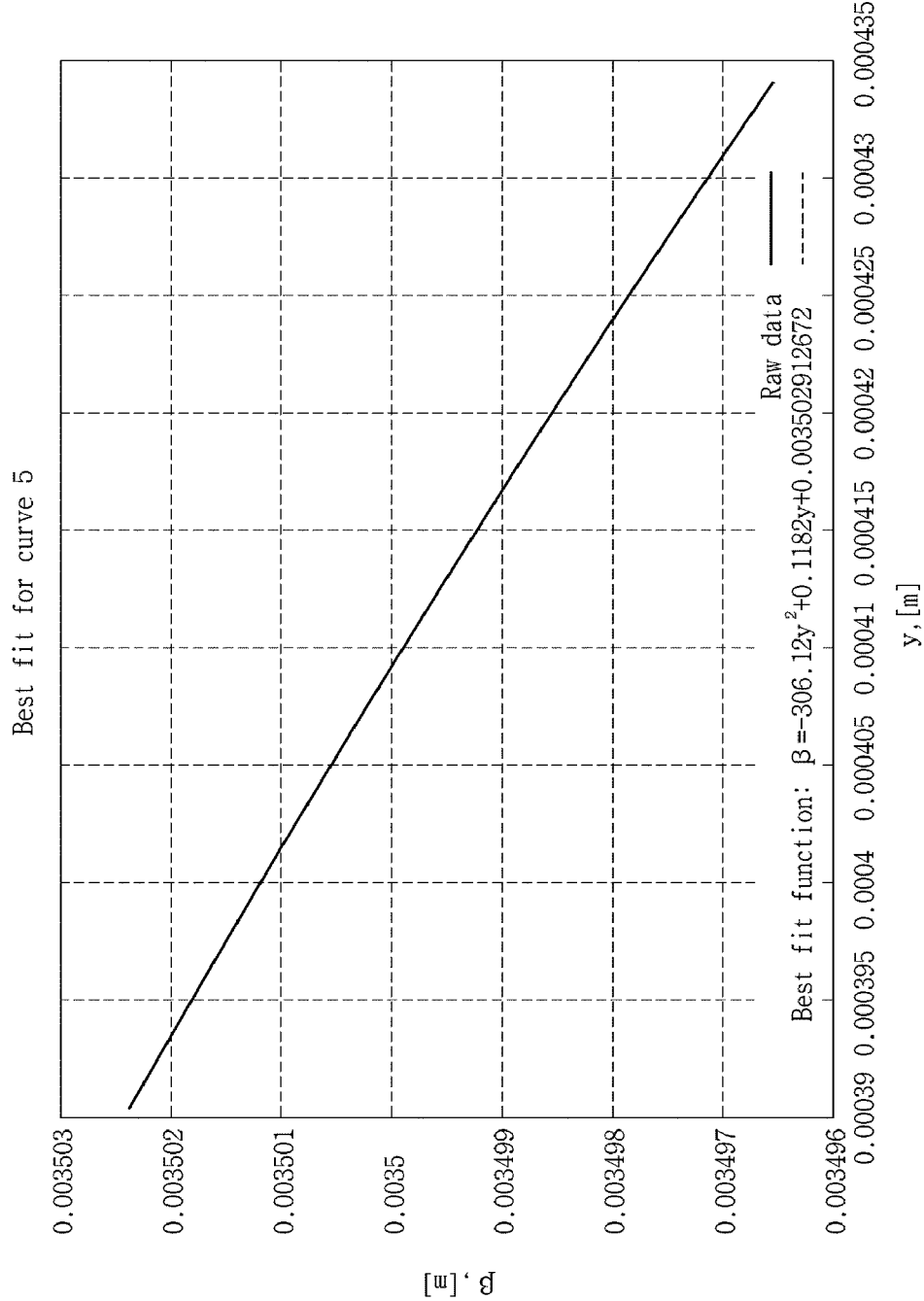

METHOD OF CONSTRUCTING PHYSICAL LENS BASED ON DEPTH-OF-FOCUS CHARACTERISTICS, AND LENS WITH EXTENDED DEPTH OF FOCUS CONSTRUCTED BY THE METHOD

CROSS REFERENCE TO RELATED APPLICATION

This application claims the benefit under 35 U.S.C. §119(a) of Korean Patent Application No. 10-2008-111002, filed on Nov. 10, 2008, the disclosure of which is incorporated herein in its entirety by reference.

BACKGROUND

1. Field

The following description relates to optical technology, and more particularly, to a method of constructing a physical lens based on depth-of-focus characteristics and an axially symmetric lens with an extended depth of focus constructed using the method.

2. Description of the Related Art

A depth of focus (DOF) is a significant characteristic of an optical system which specifies a range of distance between an object plane and a lens, or a range of distance between the lens and an image plane, within which a clean image can be obtained. Aperture size and various aberrations of a lens are critical factors for determining the DOF.

A general optical system using thin lens approximation is not appropriate for use in many industrial fields such as laser material processing, lithography, and light projection and image processing. Therefore, there is increasing need in such industrial fields for an optical system with a higher DOF.

Korean Patent Application No. 2008-43428 filed by the present applicant discloses a lens with a symmetric and continuous surface having a simple point spread function (PSF) that generates a clear image regardless of a distance from an object. The lens of the related art includes a plurality of axially symmetric layers, each of which has an extended depth of focus and focuses light onto a corresponding segment among a plurality of linear segments of focal curves located on an optical axis. The lens is included in an optical system to generate a clear image, along with an image sensor and an image processor for restoring an image sensed by the image sensor.

SUMMARY

Thus, according to an aspect, there are provided a physical lens that satisfies the above properties, and a method of constructing the same.

According to an aspect, an equation is deduced by substituting a depth-of-focus characteristic and a relation between vectors at a point of the lens surface into Snell's law. Partial differentiation is performed on the equation to obtain a differential equation satisfied by arbitrary points on the lens surface. Then, solving the differential equation, for example, by numerical analysis yields a surface curve of the physical lens which is axially symmetric.

Other aspects will become apparent to those skilled in the art from the following detailed description, which, taken in conjunction with the attached drawings, discloses exemplary embodiments of the invention.

BRIEF DESCRIPTION OF THE DRAWINGS

FIGS. 7A to 7L illustrate the curved segments illustrated in FIG. 6 along with their best fit functions.

Unless otherwise stated, elements, features, and structures are denoted by the same reference numerals throughout the drawings and the detailed description. Also, in the drawings, the relative size and depiction of elements may be exaggerated for clarity and convenience.

DETAILED DESCRIPTION

The following detailed description is provided to assist the reader in gaining a comprehensive understanding of the media, methods, apparatuses and/or systems disclosed herein. Various changes, modifications, and equivalents of the media, methods, and/or systems described herein will suggest themselves to those of ordinary skill in the art. Descriptions of conventional functions and constructions may be omitted to enhance clarity and concision.

Figure 1:
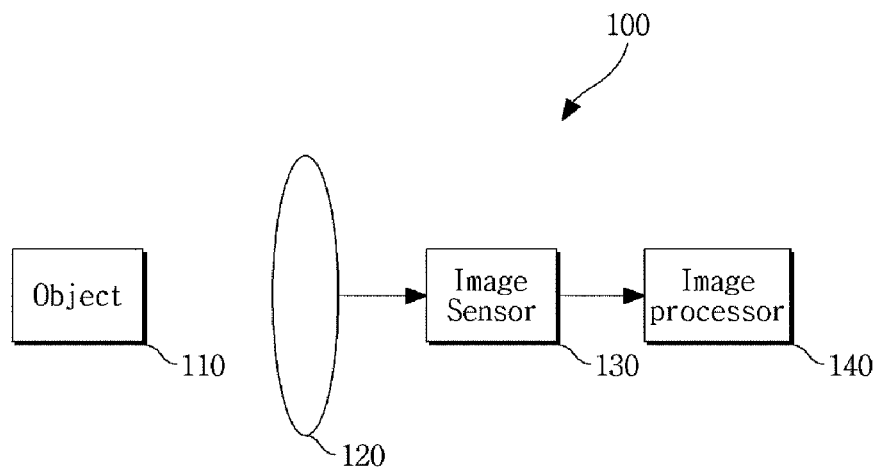
FIG. 1 is a block diagram illustrating an optical system according to an exemplary embodiment.

FIG. 1 is a block diagram illustrating an optical system 100 according to an exemplary embodiment. Referring to FIG. 1, the optical system 100 may include a lens 120 with an extended depth of focus (hereinafter, referred to as an "EDOF lens"), an image sensor 130, and an image processor 140. The optical system 100 may be implemented as a camera module or a photographing device.

The EDOF lens 120 images an object 110, and the image sensor 130 senses an image formed by the EDOF lens 120. The image sensor 130 may be a complementary metal-oxide semiconductor (CMOS) image sensor or a charge-coupled device (CCD). The image processor 140 restores the real image from the image sensed by the image sensor 130.

The EDOF lens 120 may be axially symmetric, and may include a plurality of lens layers. Each of the lens layers focuses the light onto a corresponding segment out of a plurality of linear segments of a focal curve which is located on an optical axis. The EDOF lens 120 is based on an optical device described in a paper published in *Golub* in 1981, which focuses light onto an optical axis. The paper discusses construction of an optical device that focuses light onto an arbitrary three-dimensional curve (focal curve).

One procedure for constructing the EDOF lens 120 is to set a ray correspondence rule (hereinafter, referred to as an "RCR") between points on a focal curve and points on an aperture of the EDOF lens 120. The existence of RCR means that for all given points on the focal curve, there exists a set of points on the aperture (or a lens layer) which exactly focuses the light on the given points.

The operation of EDOF lens 120 is accomplished by the coherent superposition of lens layers which individually focus light onto different points. A focal distance of each point of the lens layer is referred to as an instantaneous focal length. The coherent superposition means that lens layers are arranged such that constructive interference occurs between a light field formed by a lens layer and a light field formed by another lens layer. The constructive interference of the light fields by the coherent superposition of the lens layers is referred to as coherent mixing. The intensity of the light field increases at a point where the coherent mixing takes place, and accordingly, at this point, the EDOF lens 120 may provide a clearer image.

Figure 2:
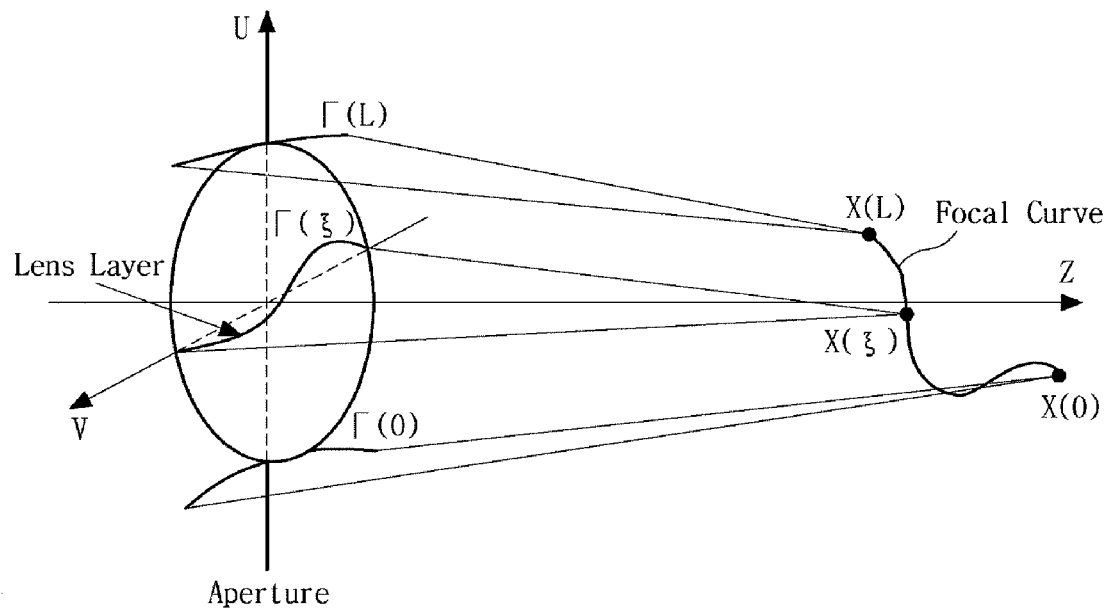
FIG. 2 is a conceptual diagram of a lens for explaining a ray correspondence rule (RCR).

FIG. 2 is a conceptual diagram of a lens for explaining the RCR. Referring to FIG. 2, for all points on a three-dimensional focal curve represented by $X(\xi)$, there exists a lens layer represented by $\Gamma(\xi)$. Once the RCR is set, a phase function of the lens has to be calculated. The phase function of the lens can be obtained in sufficient detail from the generalized method for obtaining a lens structure. However, while the conventional art may provide a more accurate analytical solution and an optical system with advanced performance for a more complicated geometrical arrangement of an RCR, it can only analyze a part of the RCR.

For example, in the optical system 100, the phase function of the EDOF lens 120 may be obtained using the focal curve and the lens layers. The optical system 100, which has symmetry, may be implemented by approximating optical properties (e.g. a phase function) of the EDOF lens 120.

It is assumed that the EDOF lens 120 is an axially symmetric optical device with the following characteristics:

(1) The aperture has a shape (e.g., circular, rectangular, etc.) and dimensions.
(2) The focal curve is a line with a particular length located at a predetermined position on the optical axis of the optical system 100.
(3) The intensity of the light field is determined according to the focal curve.
(4) Only the phase of the light varies, its intensity is constant.

Figure 3:
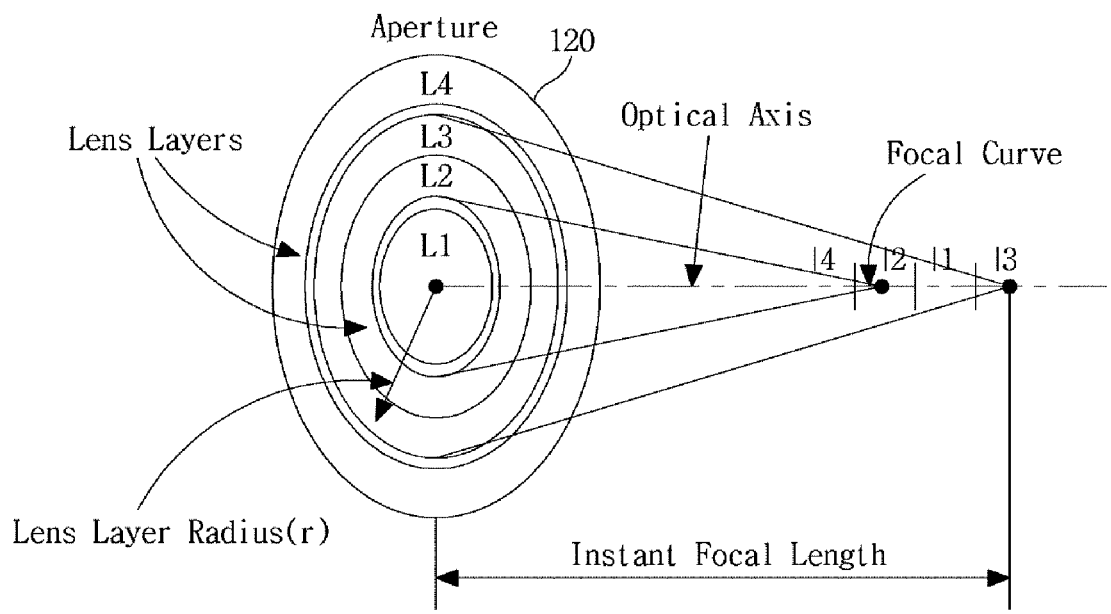
FIG. 3 is a conceptual diagram of an extended depth of focus (EDOF) lens for explaining the RCR of the EDOF lens illustrated in FIG. 1.

FIG. 3 is a conceptual diagram for explaining the RCR of the EDOF lens 120 illustrated in FIG. 1. A procedure of setting the RCR of the EDOF lens 120 will be described below in detail with reference to FIG. 3.

The aperture of the EDOF lens 120 may be divided into a plurality of lens layers L1, L2, L3, and L4 centered on the optical axis. Although only four lens layers L1, L2, L3, and L4 are illustrated in FIG. 3 for simplicity, the lens layers are not limited in number. The dimensions of each lens layer are not necessarily the same and may be different from one another. The numbering of the lens layers L1, L2, L3, and L4 may start from the center lens layer outward.

The lens layer (i.e., a set of points on the lens aperture that focus light onto the same point on the focal curve) is defined as the set of all points within the aperture of the EDOF lens 120 that are the same distance from the optical axis. Hence, the lens layer is a circle centered on the optical axis.

The focal curve may be divided into a plurality of vertical line segments I1, I2, I3, and I4 with a length and a designated position. The segments I1 to I4 may overlap one another and do not necessarily have the same length. Although only four segments I1 to I4 are illustrated in FIG. 3 for simplicity, the segments are not limited in number.

The segments I1 to I4 may be numbered, starting from the center segment, in an interleaved order. For example, when the center segment is referred to as a first segment I1, the next segment on the left may be referred to as a second segment I2, and the next segment on the right may be referred to as a third segment I3. The next segment on the left of the second segment I2 may be referred to as a fourth segment I4, and the next segment on the right of the third segment I3 may be referred to as a fifth segment (not shown). The numbering of the segments may continue until all segments are numbered.

The form of the aperture and the division of segments of the focal curve of the EDOF lens 120 in FIG. 3 are only examples for constructing the EDOF lens 120 according to an exemplary embodiment, and various modifications may be made.

As described above, each of the lens layers L1 to L4 of the EDOF lens 120 focuses light onto a corresponding segment among the segments I1 to I4 of the focal curve. For example, the first lens layer L1 may focus light onto the first segment I1, and the second lens layer L2 may focus light onto the second segment I2.

Figure 4:
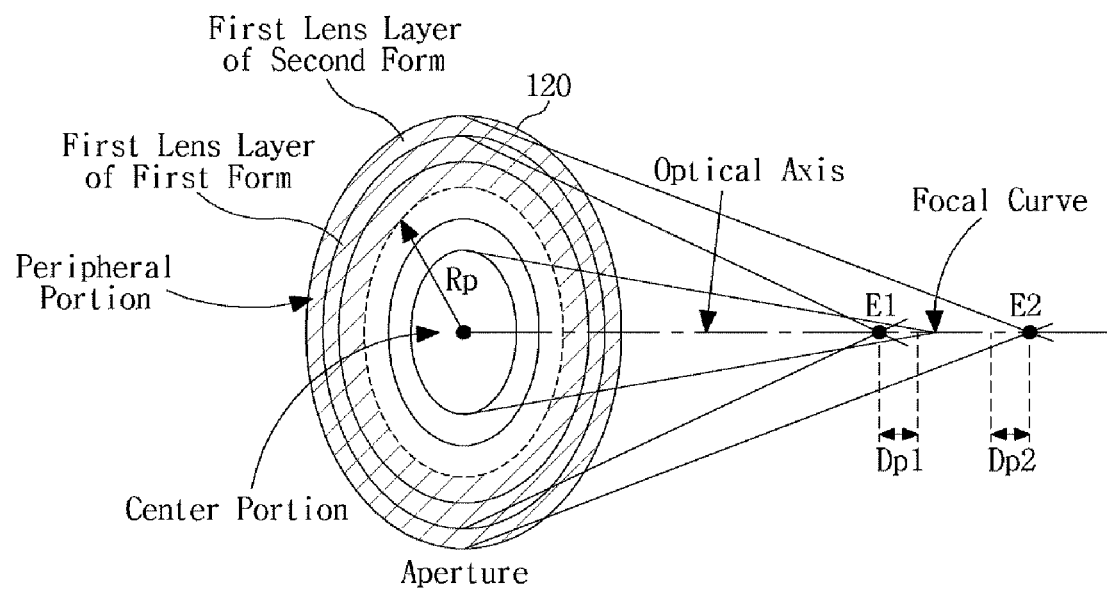
FIG. 4 is a conceptual diagram for explaining a focusing operation of the EDOF lens illustrated in FIG. 1.

FIG. 4 is a conceptual diagram of the EDOF lens 120 for explaining a focusing operation of the EDOF 120 in FIG. 1. Referring to FIG. 4, it is noted that a peripheral portion (shaded) of the EDOF lens 120 can focus light onto the closest end E1 of the focal curve and the farthest end E2 of the focal curve. The center portion of the EDOF lens 120 can focus light onto a segment between E1 and E2. The above focusing mechanism is for setting the RCR of the EDOF lens 120.

A procedure for setting the RCR of the EDOF lens 120 will now be described in more detail.

The plurality of lens layers of the EDOF lens 120 are categorized into first lens layers (shaded) and second lens layers. The first lens layers are outside of a predetermined radius Rp from the optical axis of the lens layers, and the second lens layers are within the predetermined radius Rp. The first lens layers may focus light onto two segments of the focal curve, each having a predetermined length Dp1 and Dp2 from each end E1 and E2.

The first lens layers may be divided into at least one first lens layer of a first form, and at least one first lens layer of a second form, for example, by an interleaving method.

At least one first lens layer of a first form may focus light onto a segment having a predetermined length (e.g. Dp2) from one end (e.g. E2) of the focal curve. At least one first lens layer of a second form may focus light onto a segment having a predetermined length (e.g. Dp1) from the other end (e.g. E1) of the focal curve. The predetermined distances Dp1 and Dp2 corresponding to respective ends E1 and E2 may be set different from each other.

The plurality of second lens layers may include at least one second lens layer of a first form and at least one second lens layer of a second form. At least the second lens layer of the first form may generate a light field which is to be coherently mixed with a light field generated by the first lens layer of the first form on a segment within a predetermined distance Dp2 from one end (e.g. E2) of the focal curve.

At least the second lens layer of the second form may generate a light field that is to be coherently mixed with a light field generated by the first lens layer of the second form on a segment within the predetermined distance Dp1 from the other (e.g. E1) end of the focal curve.

However, there may be circumstances in which the RCR needs to be slightly amended due to restrictions caused by light interference, lens manufacturing and optimization, and distribution pattern of the intensity of light which varies according to the focal curve. Amending the RCR may cause overlap between the segments of the focal curve and/or ambiguity in the definition of the center segment of the focal curve.

For example, it is well known to those skilled in the art that the smaller the aperture is, the larger the DOF of an optical device is. Thus, it is more problematic to focus the light passing through the peripheral portion of the EDOF lens onto either end of the focal curve than to accurately focus the light passing through the center portion of the EDOF lens onto the center of the focal curve.

To resolve this problem, the RCR of the EDOF lens has characteristics described below.

The EDOF lens 120 focuses light onto both ends of the focal curve using the first lens layers (the peripheral portion of the EDOF lens 120) prior to setting a focusing range of the second lens layers (the center portion).

The focusing mechanism of the second lens layers of the EDOF lens 120 may be set such that coherent mixing with the light fields generated by the first lens layers of the EDOF lens 120 can occur. Therefore, according to this focusing mechanism, the light fields generated by the second lens layers may increase the intensity of the light fields generated by the first lens layers.

The second lens layers may focus light onto any sections of the focal curve in order to perform coherently mixed focusing with the first lens layers.

In setting the RCR, the plurality of segments of the focal curve, corresponding to the plurality of lens layers, may overlay one another. The distribution of the intensity of a light field on a segment of the focal curve may be controlled by the thickness of a lens layer corresponding to the segment.

Figure 5:
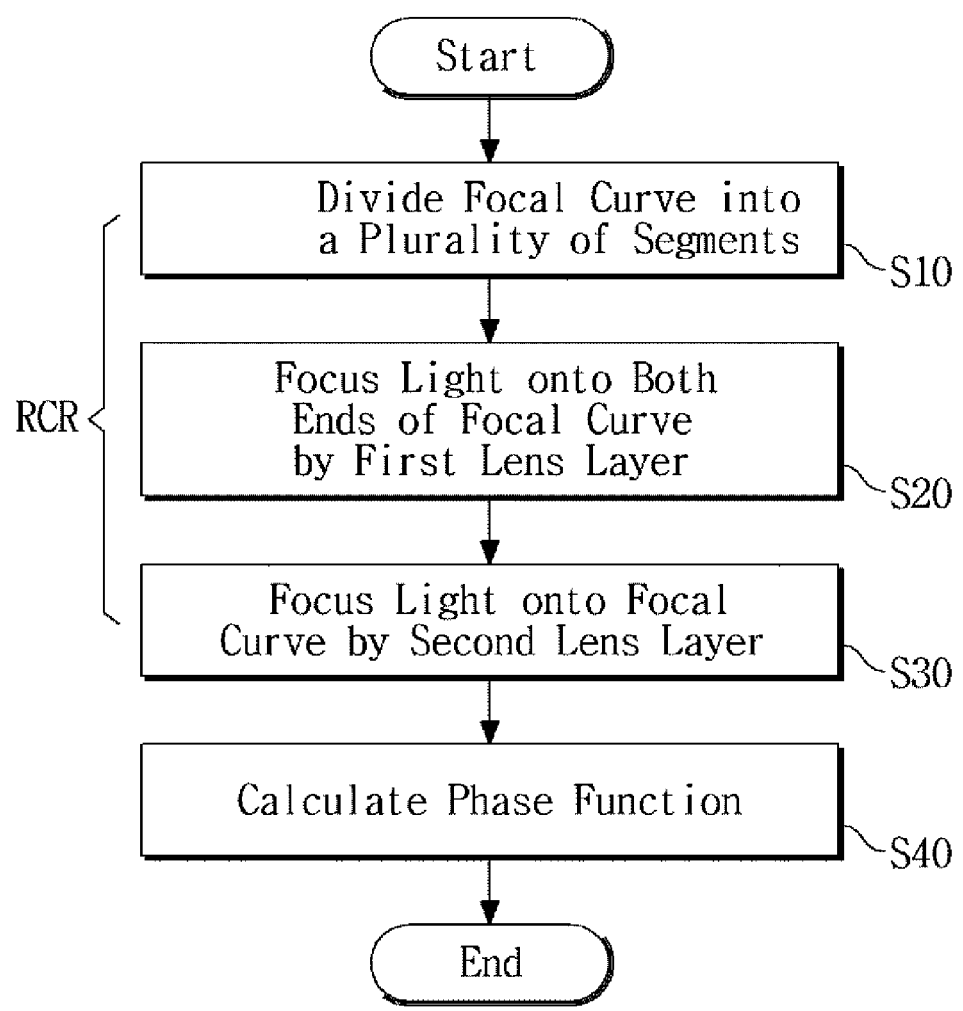
FIG. 5 is a flowchart illustrating a procedure for constructing an EDOF lens according to an exemplary embodiment.

FIG. 5 is a flowchart illustrating a procedure for constructing an EDOF lens 120 according to an exemplary embodiment. The construction procedure will now be described in brief with reference to FIGS. 3 to 5.

First, a focal curve of the EDOF lens 120 is divided into a plurality of segments I1, I2, I3, and I4 (operation S10). Once the focal curve is divided into the plurality of segments I1 to I4, each of the first lens layers of the EDOF lens 120 focuses the light onto segments of both ends of the focal curve (operation S20). When focusing onto both ends of the focal curve, the second lens layers of the EDOF lens 120 focuses the light onto the focal curve (operation S30). As described above, coherent mixing between the result of focusing by the second lens layers and the result of focusing by the first lens layers may occur. Operations S10 to S30 are performed to set the RCR of the EDOF lens 120.

Once the RCR of the EDOF lens 120 is set, a phase function of the EDOF lens 120 is calculated (operation S40). The phase function of the EDOF lens 120 may be defined by approximating an instantaneous focal length of the EDOF lens 120.

EQN. 1 represents an instantaneous focal length of the EDOF lens 120.

$$F(r) = \begin{cases} F_1(r_1), \text{ for first lens layer} \\ F_2(r_2), \text{ for second lens layer} \end{cases} \quad \text{EQN. 1}$$

Here, F(r) represents the instantaneous focal length of a lens layer with a radius of r, r1 indicates a radius of the first lens layer, and r2 represents a radius of the second lens layer. Referring to EQN. 1, the instantaneous focal length of the EDOF lens 120 is determined by the radius of the lens layer.

The phase function of the EDOF lens 120 may be defined based on optical phase lag of the EDOF lens 120. EQN. 2 indicates the optical phase delay of the EDOF lens 120:

$$\Phi(r) = \frac{\pi r^2}{\lambda F(r)} \quad \text{EQN. 2}$$

Here, $\Phi(r)$ represents an optical phase delay of an optical element used to design an optical device, and r represents a radius of a lens layer. $\lambda$ represents wavelength of light, and F(r) indicates a function of an instantaneous focal length in relation to the radius of the lens layer.

The phase function of the EDOF lens 120 may be easily derived from the relation between the instantaneous focal length (EQN. 1) of the EDOF lens 120 and the optical phase delay (EQN. 2) thereof.

Figure 6:
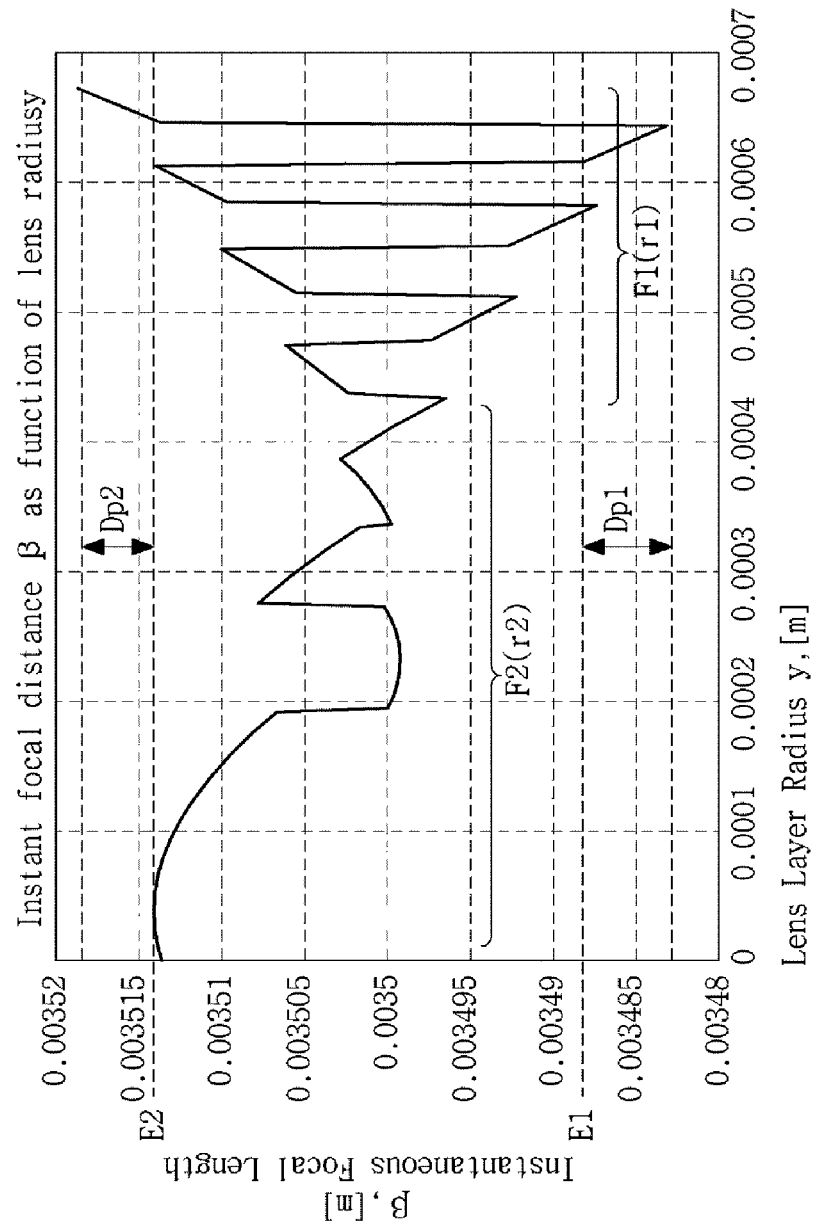
FIG. 6 is a graph showing results of instantaneous focal length simulation for lens layers of the EDOF lens according to an exemplary embodiment.
Figure 7A:
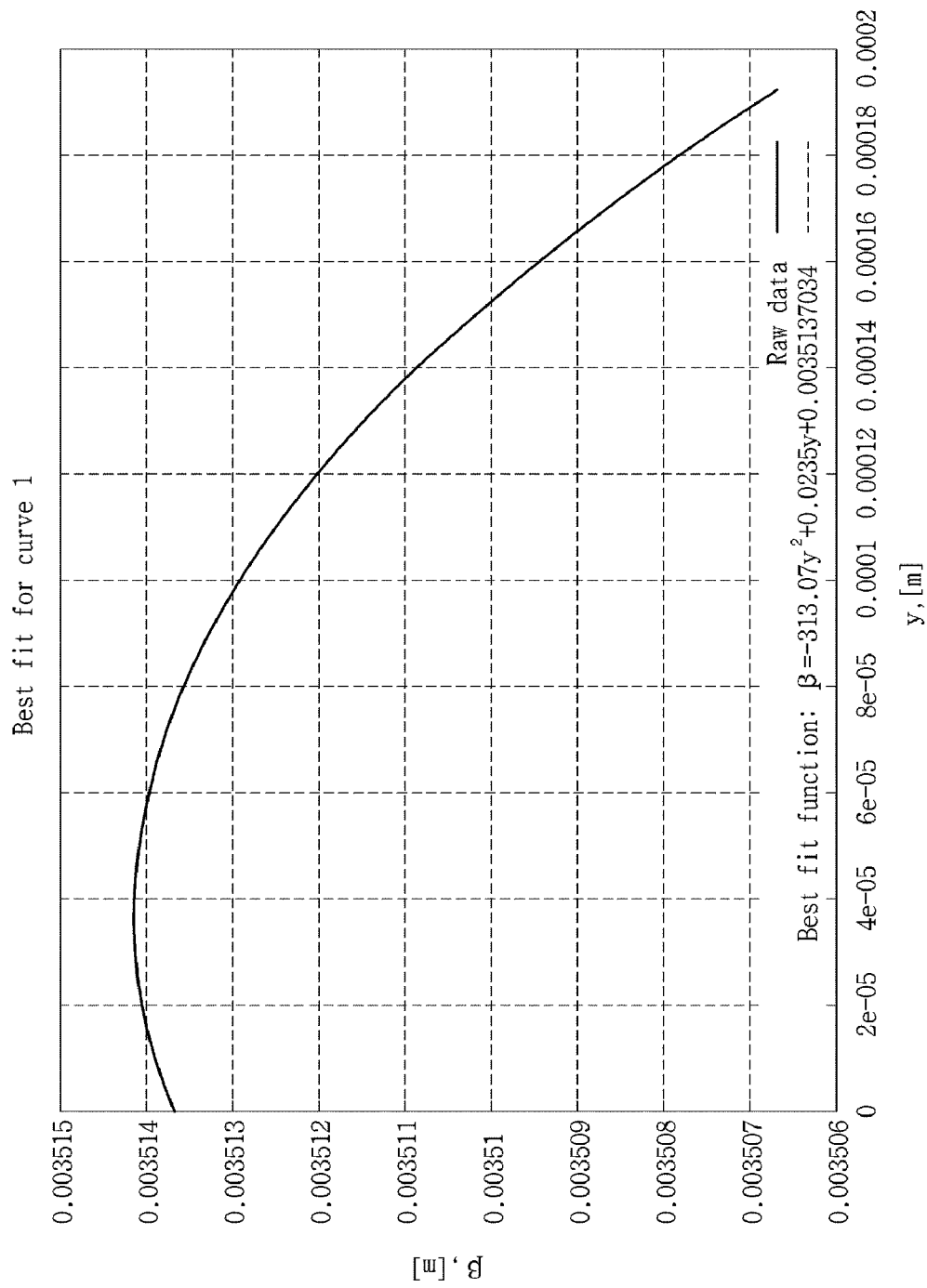
Figure 7F:
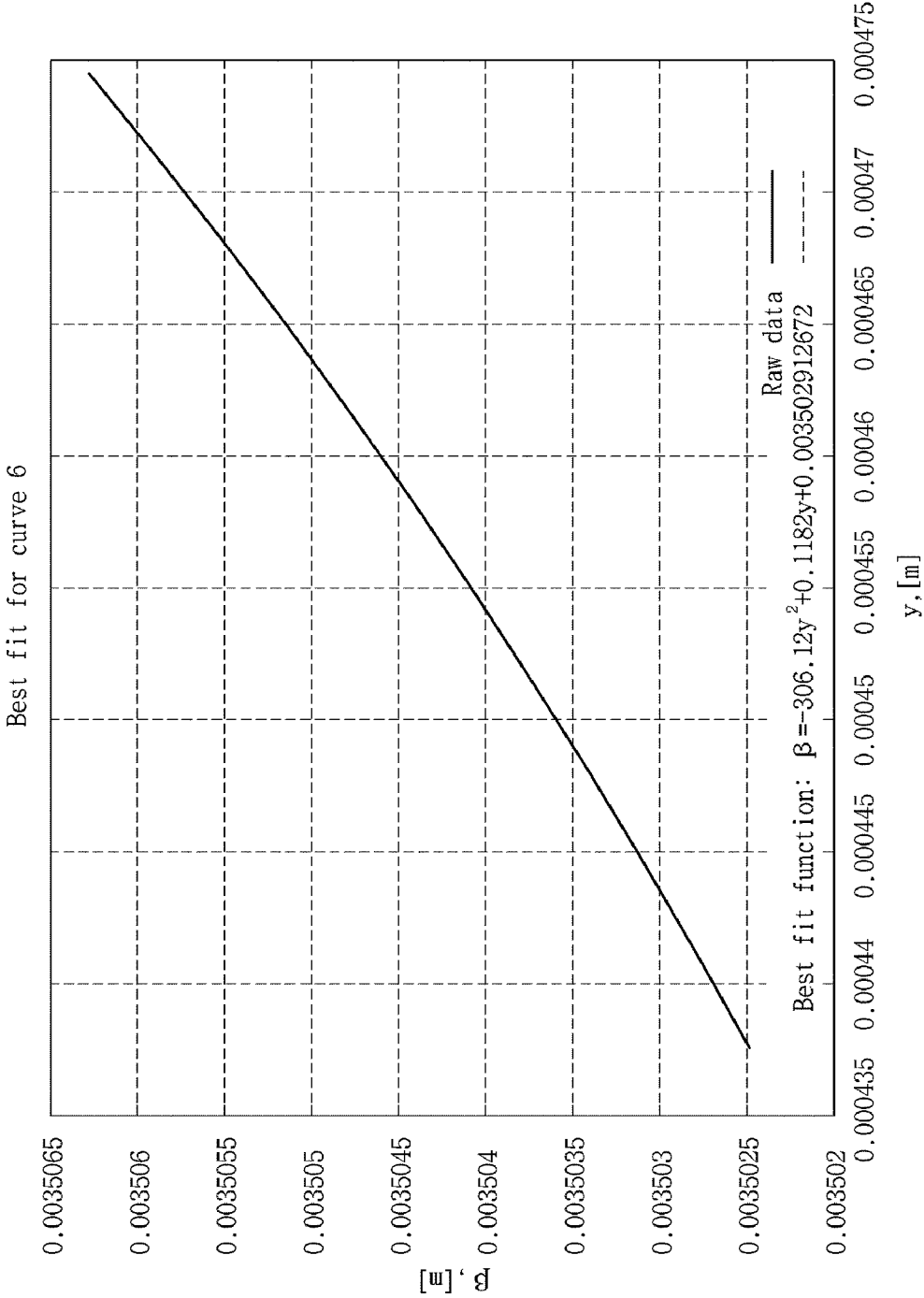
Figure 7G:
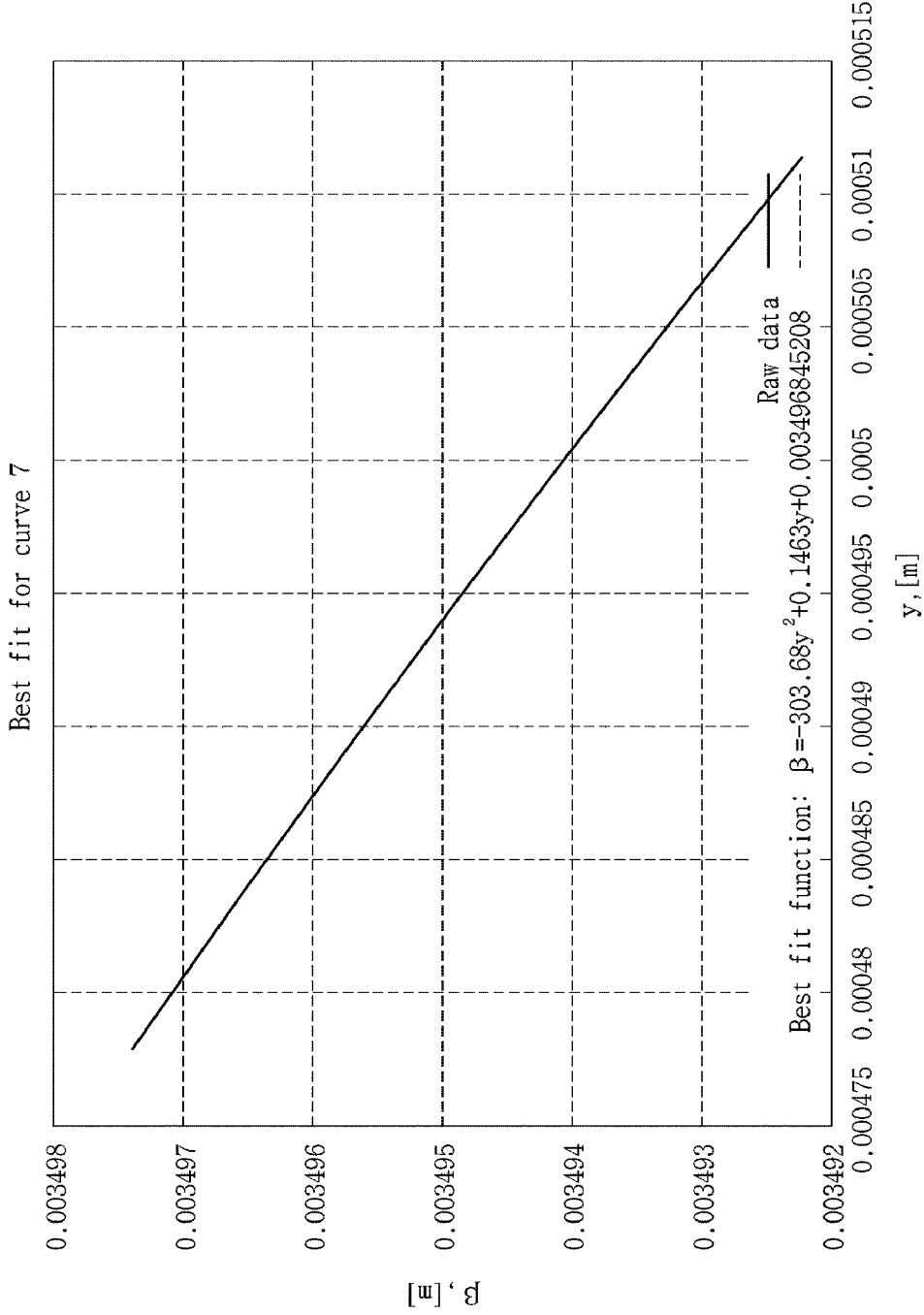
Figure 7H:
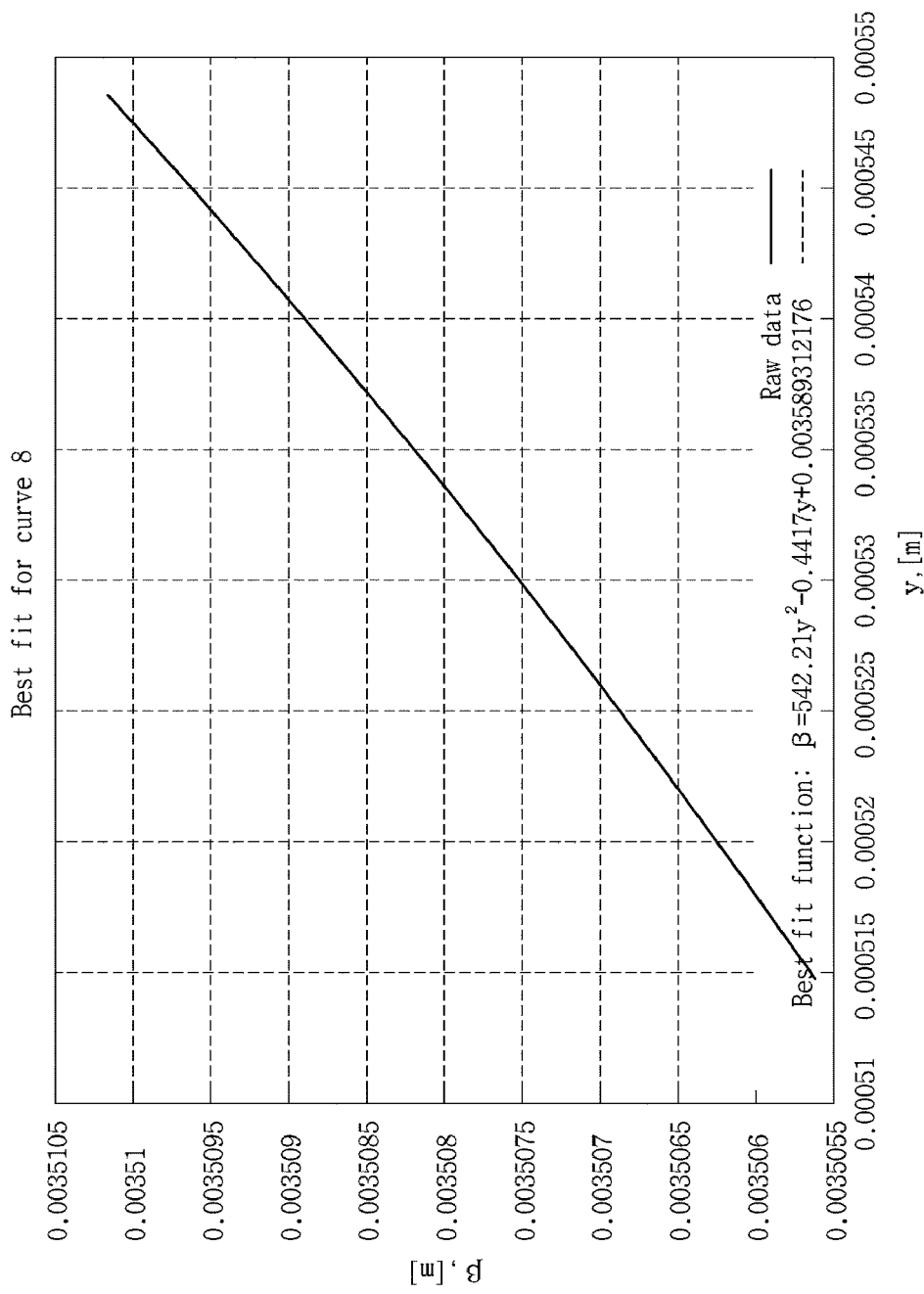
Figure 7I:
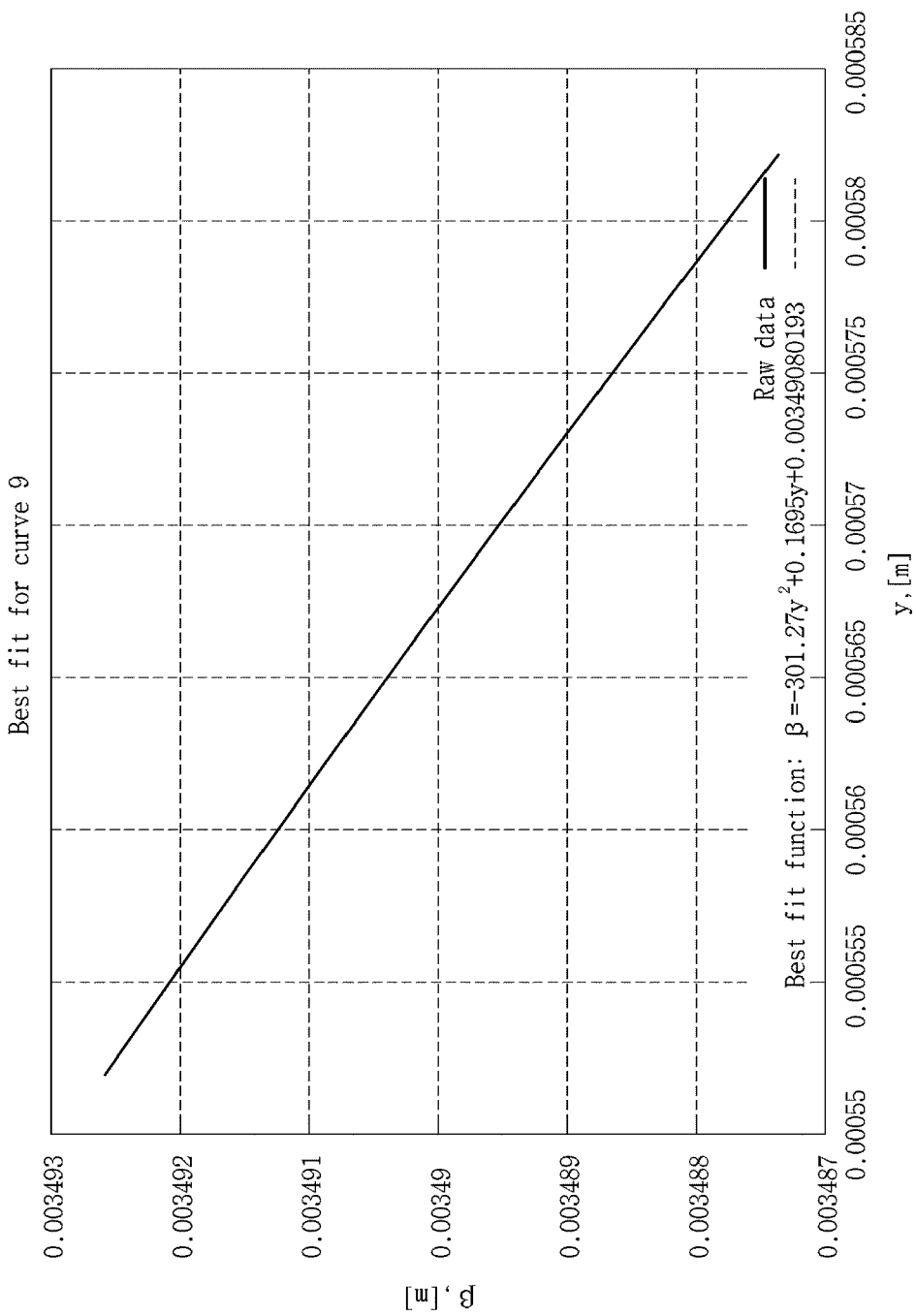
Figure 7J:
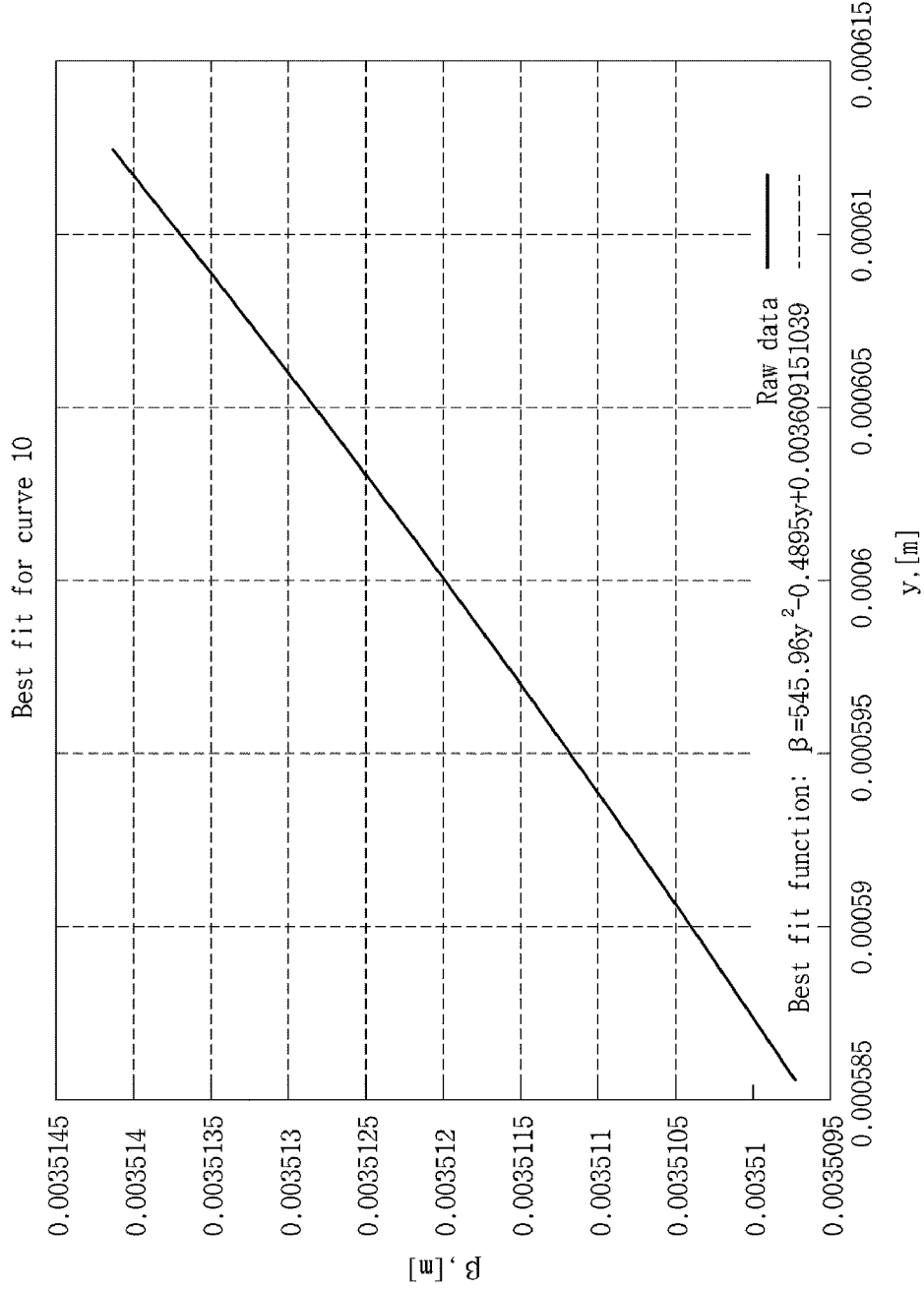
Figure 7K:
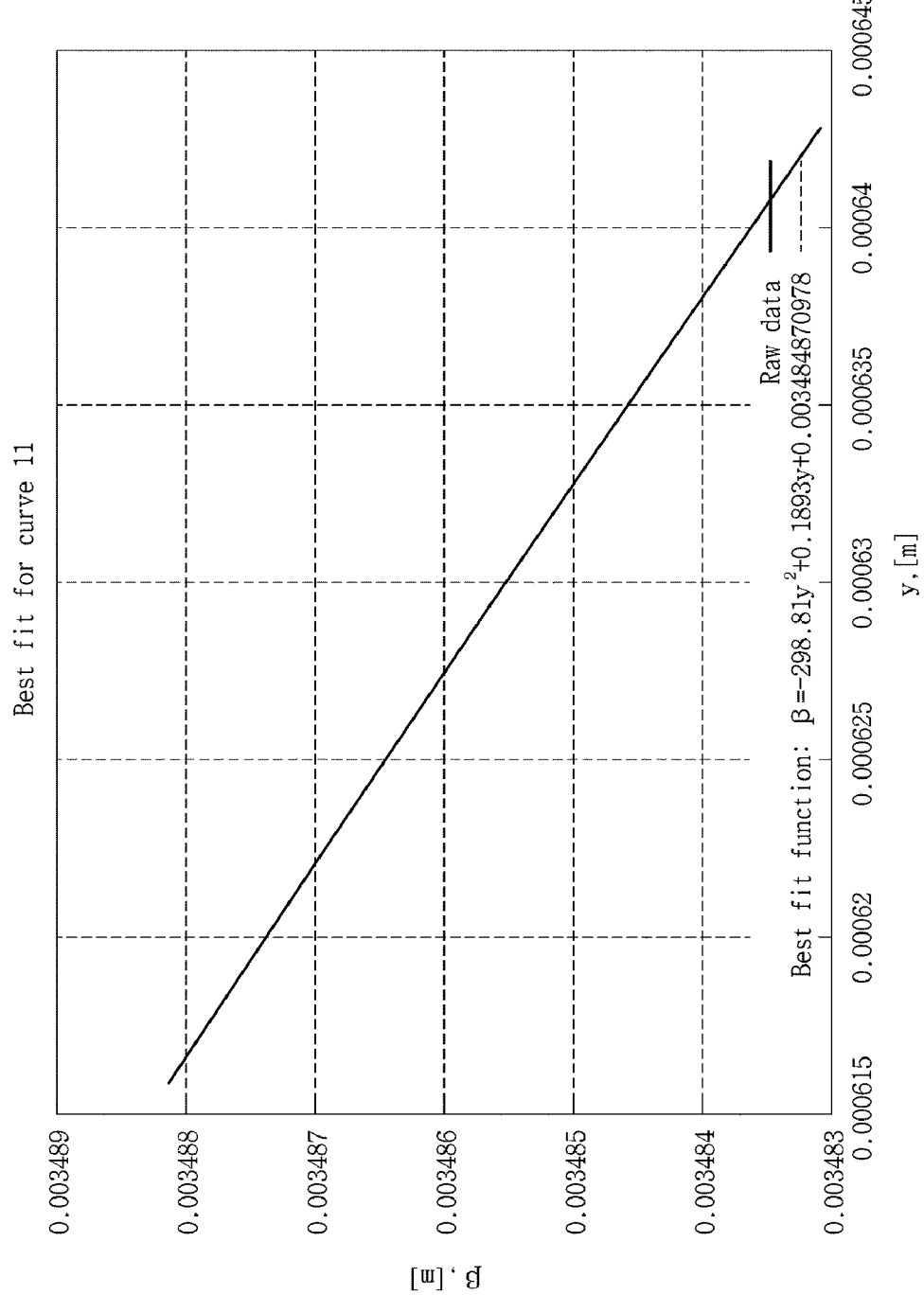
Figure 7L:
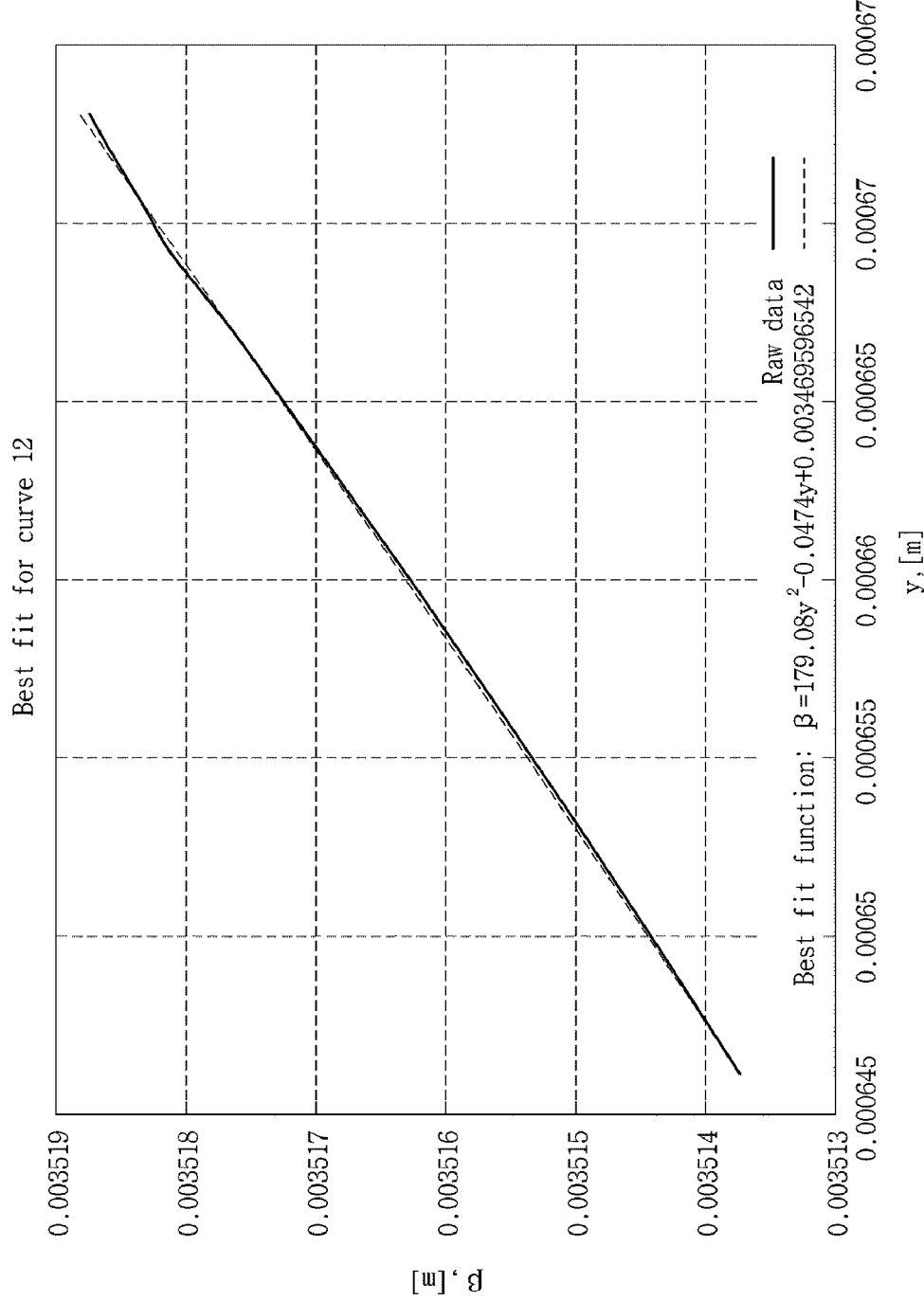

FIG. 6 is a graph showing results of simulating an instantaneous focal length versus the radius of the lens layer of the EDOF lens 120. The simulation is performed under the conditions described below. The EDOF lens 120 is optimized to focus a parallel beam of light onto a focal curve with a length of between about 3.48 and about 3.52 mm at a constant intensity distribution level. Also, the diameter of an aperture is set as 1.25 mm, and the aperture is composed of twelve lens layers.

Referring to FIG. 6, results of $F_1(r_1)$ and $F_2(r_2)$ may appear smooth and continuous in each segment, but discontinuous at the borders of the segments. It can be seen that the first lens layers of the EDOF lens 120 focus light onto both ends of the focal curve (a segment with a length of Dp1 from one end E1 and a segment with a length of Dp2 from the other end E2).

Procedures for constructing a physical lens which satisfies the optical characteristics illustrated in FIG. 6 will now be described. The focal curve of FIG. 6 is segmented into twelve continuous curved segments for each of which a linear regression is performed. All the curve segments conform most closely to the following quadratic curve:

$$\beta_i(y) = a_i y^2 + b_i y + c_i$$

Here, the subscript i denotes the ith curved segment in FIG. 6.

The following coefficients for the twelve continuous curved segments were obtained from the linear regression:

$$a_1 = -313.07, b_1 = 0.0235, c_1 = 0.0035137034, \quad (2)$$

$$a_2 = 534.53, b_2 = -0.2472, c_2 = 0.003527877626, \quad (3)$$

$$a_3 = -309.02, b_3 = 0.0818, c_3 = 0.0035088062, \quad (4)$$

$$a_4 = 536.05, b_4 = -0.3275, c_4 = 0.0035493232, \quad (5)$$

$$a_5 = -306.12, b_5 = 0.1182, c_5 = 0.003502912672, \quad (6)$$

$$a_6 = 539.03, b_6 = -0.3891, c_6 = 0.003569538239, \quad (7)$$

$$a_7 = -303.68, b_7 = 0.1463, c_7 = 0.003496845208, \quad (8)$$

$$a_8 = 542.21, b_8 = -0.4417, c_8 = 0.003589312176, \quad (9)$$

$$a_9 = -301.27, b_9 = 0.1695, c_9 = 0.00349080193, \quad (10)$$

$$a_{10} = 545.96, b_{10} = -0.4895, c_{10} = 0.003609151039, \quad (11)$$

$$a_{11} = -298.81, b_{11} = 0.1893, c_{11} = 0.003484870978, \quad (12)$$

$$a_{12} = 179.08, b_{12} = -0.0474, c_{12} = 0.003469596542. \quad (13)$$

FIGS. 7A to 7L illustrate the curved segments of FIG. 6 along with their best fit functions. A solid line indicates actual data, and a dotted line is a quadratic function fit to the data.

The curved segments illustrated in FIG. 6 are represented by quadratic functions in these figures.

Figure 8:
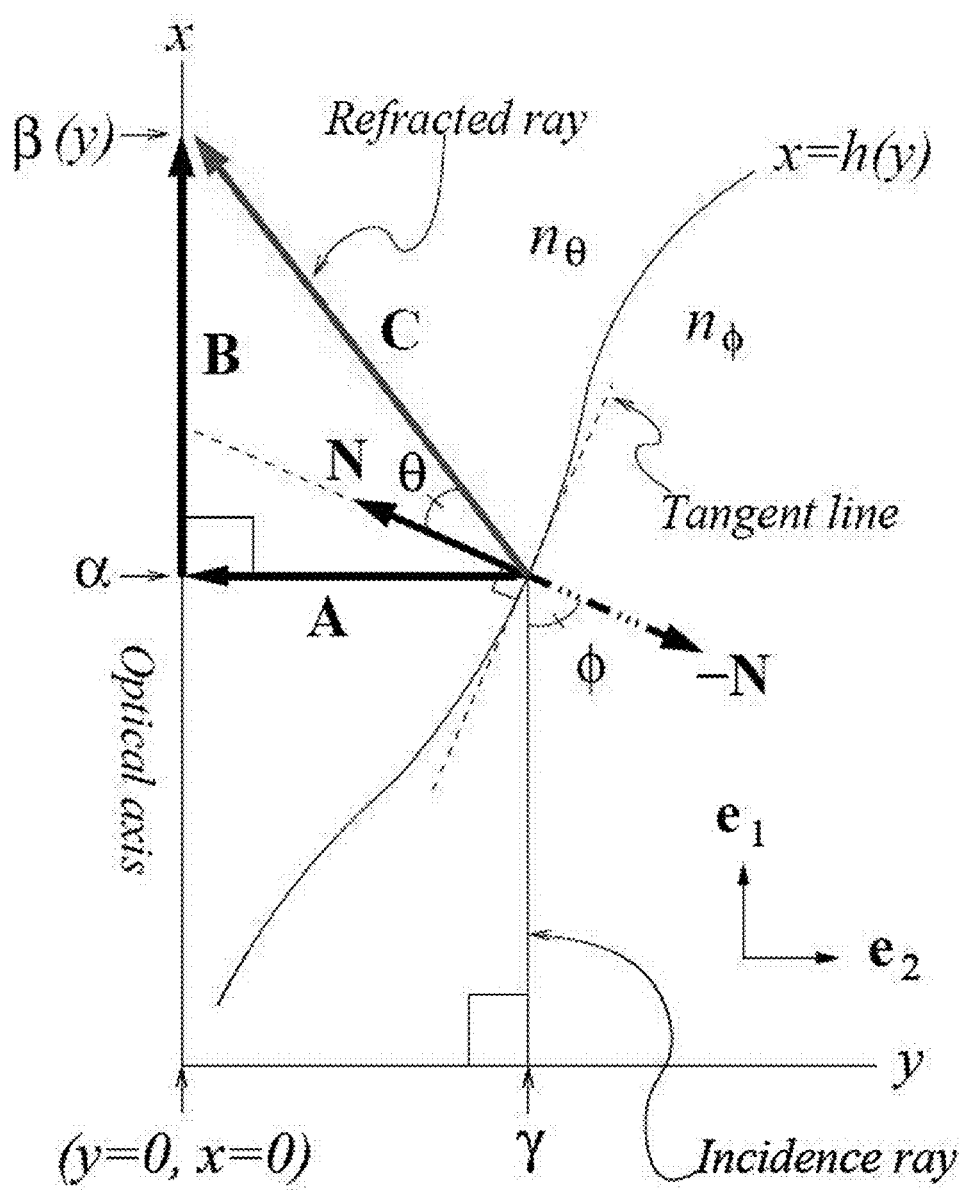
FIG. 8 is a diagram illustrating an example of applying Snell's law at a point of the lens surface according to an exemplary embodiment.

A procedure for obtaining a physical lens whose focal length in relation to a radius of a lens layer is determined by the above twelve quadratic functions will now be described. FIG. 8 is a graph showing a focal length β as a function of y when it is assumed that a surface curve of the physical lens is x=h(y), which indicates a focal length characteristic as shown in FIG. 6. When a ray of light passes through a boundary between two media having different refractive indices, its path is described by Snell's Law:

$$n_\phi \sin\phi = n_\theta \sin\theta \qquad \text{EQN. 3}$$

Here, $n_\phi$ and $n_\theta$ represent refractive indices, and $\phi$ and $\theta$ represent the angle of incidence and angle of refraction, respectively. If n denotes the normal vector to a local point y=γ on the curve x=h(y), then $|-N\times(-e_1)|=|-N|\times|(-e_1)|\sin\phi = N\sin\phi$.

That is, $$\sin\phi = \frac{|N \times e_1|}{N} \qquad \text{EQN. 4}$$

Here, N denotes the magnitude of vector N, and $e_1$ represents the unit vector for the x axis. In a similar manner, an equation for sin θ may be obtained by considering vectors A, B, and C. The vectors A, B, and C satisfy the relation:

$$A+B=C$$

In explicit form, vectors A and B are defined as:

$$A=-\lambda e_2, \; B=(\beta-\alpha)e_1$$

Here, $e_2$ is a unit vector for the y axis. The vector C becomes:

$$C=(\beta-\alpha)e_1-\lambda e_2$$

The cross product of N and C is given by:

$$N\times C=(\beta-\alpha)N\times e_1-\lambda N\times e_2,$$

and its magnitude becomes:

$$|N\times C|=|(\beta-\alpha)N\times e_1-\lambda N\times e_2|=NC\sin\theta$$

Thus, sin θ is expressed by:

$$\sin\theta = \frac{|(\beta-\alpha)N\times e_1-\lambda\times e_2|}{NC}.$$

Here, C denotes the size of the vector. Substitution of this relation into the above equation for sin θ yields:

$$\sin\theta = \frac{|(\beta-\alpha)N\times e_1-\gamma N\times e_2|}{N\sqrt{(\beta-\alpha)^2+\gamma^2}} \qquad \text{EQN. 5}$$

Substituting the results of EQNS. 4 and 5 into EQN. 3 (Snell's Law) yields:

$$\frac{n_\phi}{n_\theta}\sqrt{(\beta-\alpha)^2+\gamma^2} = \frac{|(\beta-\alpha)N\times e_1-\gamma N\times e_2|}{|N\times e_1|}$$

where the normal vector N needs to be defined as a function of x and y. The explicit equation for the normal vector N may be obtained by the function:

$$g(x,y)=x-h(y).$$

The gradient of function g(x, y) provides the equation for the normal vector N:

$$N = \nabla g = \frac{\partial g}{\partial x}e_1 + \frac{\partial g}{\partial y}e_2 = e_1 - \frac{\partial h}{\partial y}e_2$$

Since in FIG. 8 the vector N is a normal vector at x=α, N is expressed as:

$$N = e_1 - \left.\frac{\partial h}{\partial y}\right|_{y=\gamma} e_2$$

Therefore, $$N\times e_1 = e_1\times e_1 - \left.\frac{\partial h}{\partial y}\right|_{y=\gamma} e_2\times e_1,$$

$$N\times e_2 = e_1\times e_2 - \left.\frac{\partial h}{\partial y}\right|_{y=\gamma} e_2\times e_2,$$

Since $e_1\times e_1 = e_2\times e_2 = 0$, $$N\times e_1 = -\left.\frac{\partial h}{\partial y}\right|_{y=\gamma} e_3, \; N\times e_2 = e_3,$$

where $e_3$ is the unit vector with the property $$e_1\times e_2=e_3, \; e_2\times e_1=e_3|.$$

Insertion of the above result into EQN. 6 yields:

$$\frac{n_\phi}{n_\theta}\sqrt{(\beta-\alpha)^2+\gamma^2} = \frac{\left|\left((\beta-\alpha)\left.\frac{\partial h}{\partial y}\right|_{y=\gamma}-\gamma\right)e_3\right|}{\left|\left.\frac{\partial h}{\partial y}\right|_{y=\gamma} e_3\right|} \qquad \text{EQN. 7}$$

or $$\frac{n_\phi}{n_\theta}\sqrt{(\beta-\alpha)^2+\gamma^2} = \beta-\alpha-\frac{\gamma}{\left.\frac{\partial h}{\partial y}\right|_{y=\gamma}} \qquad \text{EQN. 8}$$

where $$\beta-\alpha \geq \frac{\gamma}{\left.\frac{\partial h}{\partial y}\right|_{y=\gamma}}.$$

This condition comes from the fact that the numerator and the denominator of the right side of the EQN. 8 cannot be negative valued, and the numerator cannot be zero either.

Rearranging EQN. 8 provides:

$$\left.\frac{\partial h}{\partial y}\right|_{y=\gamma} = \frac{\gamma}{\beta-\alpha-\frac{n_\phi}{n_\theta}\sqrt{(\beta-\alpha)^2+\gamma^2}} \qquad \text{EQN. 9}$$

where α and λ are constants, and β=β(y).

Here y=γ is not a limitation to the equation and any y belonging to the domain of h(y) satisfies EQN. 9. To generalize EQN. 9 to all y forming the domain of x=h(y), the following replacement is performed first:

$$\alpha \rightarrow x, \gamma \rightarrow y, \left.\frac{\partial h}{\partial y}\right|_{y=\gamma} \rightarrow \frac{\partial h}{\partial y} = \frac{dx}{dy}$$

and then EQN. 9 becomes $$\frac{dx}{dy} = \frac{y}{\beta - x - \frac{n_\phi}{n_\theta}\sqrt{(\beta-x)^2+y^2}}$$ EQN. 10 with the restriction $$\beta - x \geq \frac{y}{\frac{dx}{dy}}.$$

β satisfying the condition defined by the restriction may be obtained by substituting EQN. 10 for dx/dy, $$\beta - x \geq \beta - x - \frac{n_\phi}{n_\phi}\sqrt{(\beta-x)^2+y^2}$$

and rearranging the above equation yields (when the refractive indices are positive real numbers):

$$\sqrt{(\beta-x)^2+y^2} \geq 0.$$

This equation is always valid for all real numbers.

The solution to EQN. 10 may be obtained by solving an initial-value problem of the form:

$$\frac{dx}{dy} = \frac{y}{\beta - x - \frac{n_\phi}{n_\theta}\sqrt{(\beta-x)^2+y^2}}, \quad x(y_0) = x_0$$

The initial condition may be selected as x(0)=0 without loss of generality, yielding:

$$\frac{dx}{dy} = \frac{y}{\beta_i - x - \frac{n_\phi}{n_\theta}\sqrt{(\beta_i-x)^2+y^2}}, \quad x(0) = 0$$ EQN. 11

Here, the subscript i in $\beta_i$ is applied since the input specification defined in FIG. 6 is not continuous over the entire range of x but is only piece-wise continuous. The domain for each, $\beta_i$, is given by:

$\beta_1$: 0≦y≦0.00019182692,
$\beta_2$: 0.00019519231≦y≦0.00027259615,
$\beta_3$: 0.00027596154≦y≦0.00033317308,
$\beta_4$: 0.00033653846≦y≦0.00038701923,
$\beta_5$: 0.00039038462≦y≦0.00043413462,
$\beta_6$: 0.0004375≦y≦0.00047451923,
$\beta_7$: 0.00047788462≦y≦0.00051153846,
$\beta_8$: 0.00051490385≦y≦0.00054855769,
$\beta_9$: 0.00055192308≦y≦0.00058221154,
$\beta_{10}$: 0.00058557692≦y≦0.0006125,
$\beta_{11}$: 0.00061586538≦y≦0.00064278846,
$\beta_{12}$: 0.00064615385≦y≦0.00067307692.

Figure 9:
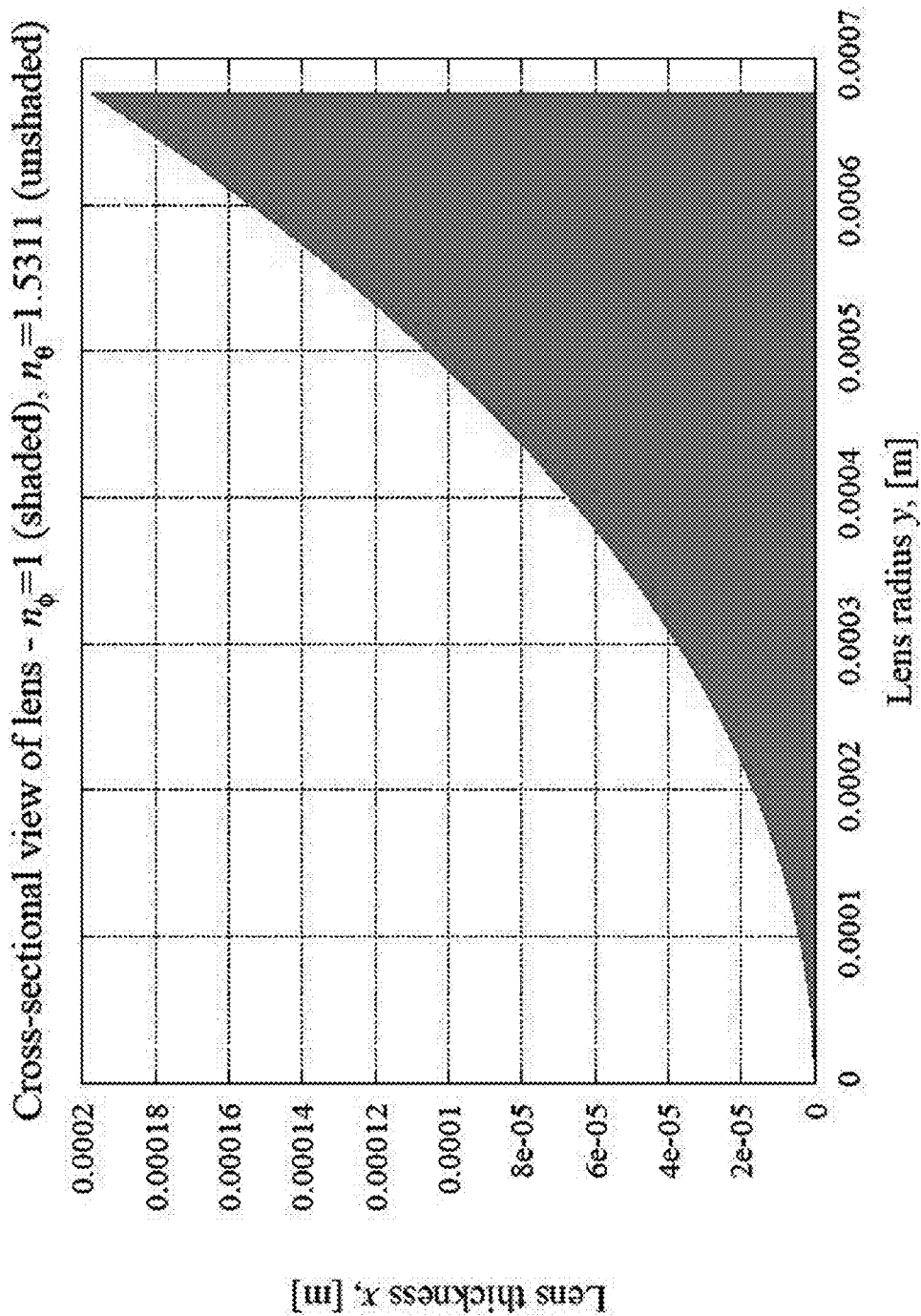
FIG. 9 is a cross-sectional view of a predicted physical lens.
Figure 11:
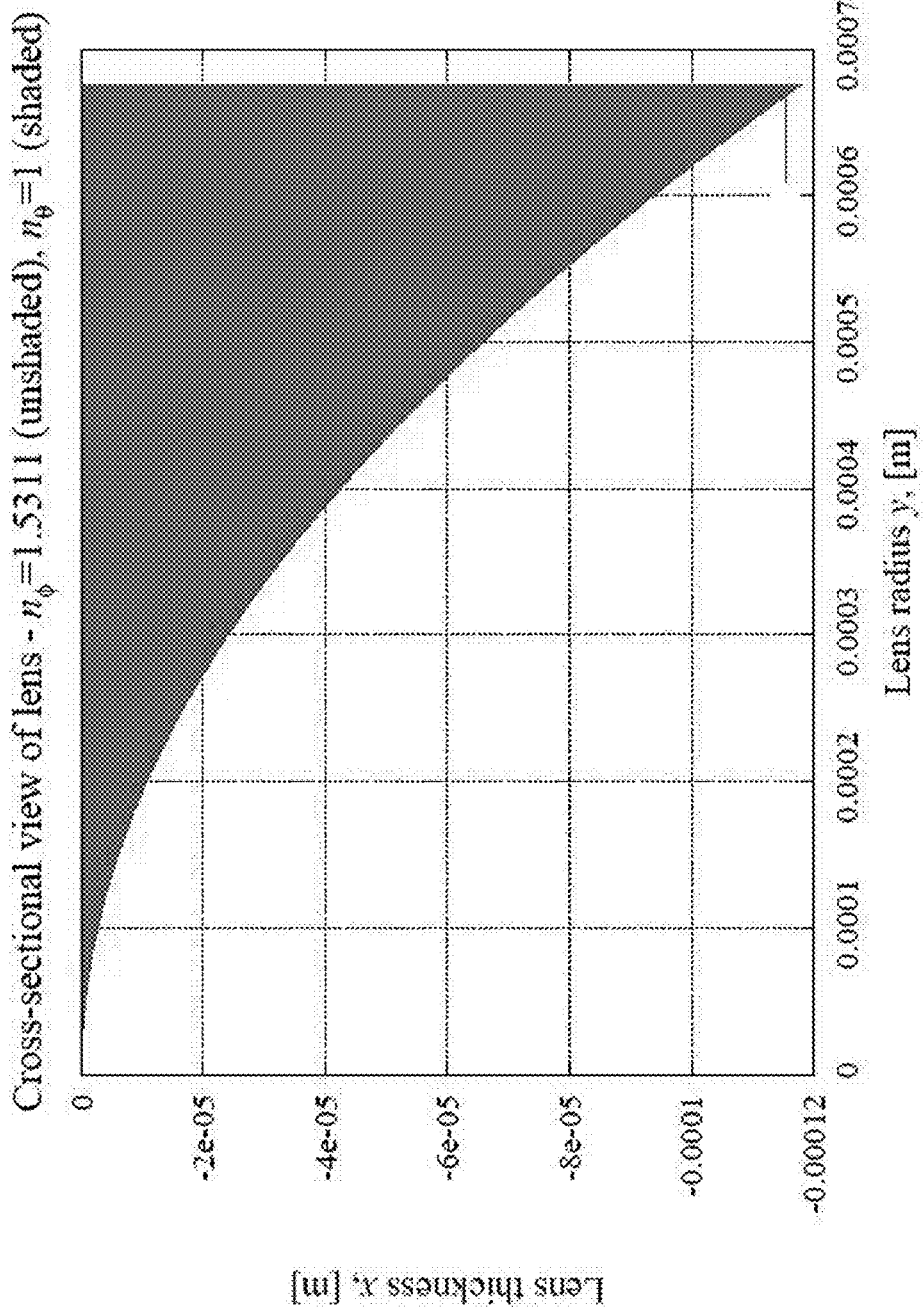
FIG. 11 is another cross-sectional view of a predicted physical lens.

The surface of a physical lens satisfying the characteristics illustrated in FIG. 6 may be obtained by solving EQN. 11 by the Runge-Kutta method. The Runge-Kutta routine coded in FORTRAN 90 and the results of coding are illustrated in FIGS. 9 and 11. Since a lens is axially symmetric, the physical lens may be obtained by rotating the curve about the x-axis. FIG. 9 is a diagram illustrating a situation where light enters a lens from the air. As shown in FIG. 8, a light ray is incident in a positive x direction. From this fact, it can be seen that the unshaded region in FIG. 9 indicates the physical lens. Rotating the unshaded region about the x-axis produces a physical picture of a lens.

The best fit curve for obtained data is represented by EQN. 12:

$$x = ay^6 + by^5 + cy^4 + dy^3 + ey^2 + fy + g |$$ EQN. 12

Figure 10:
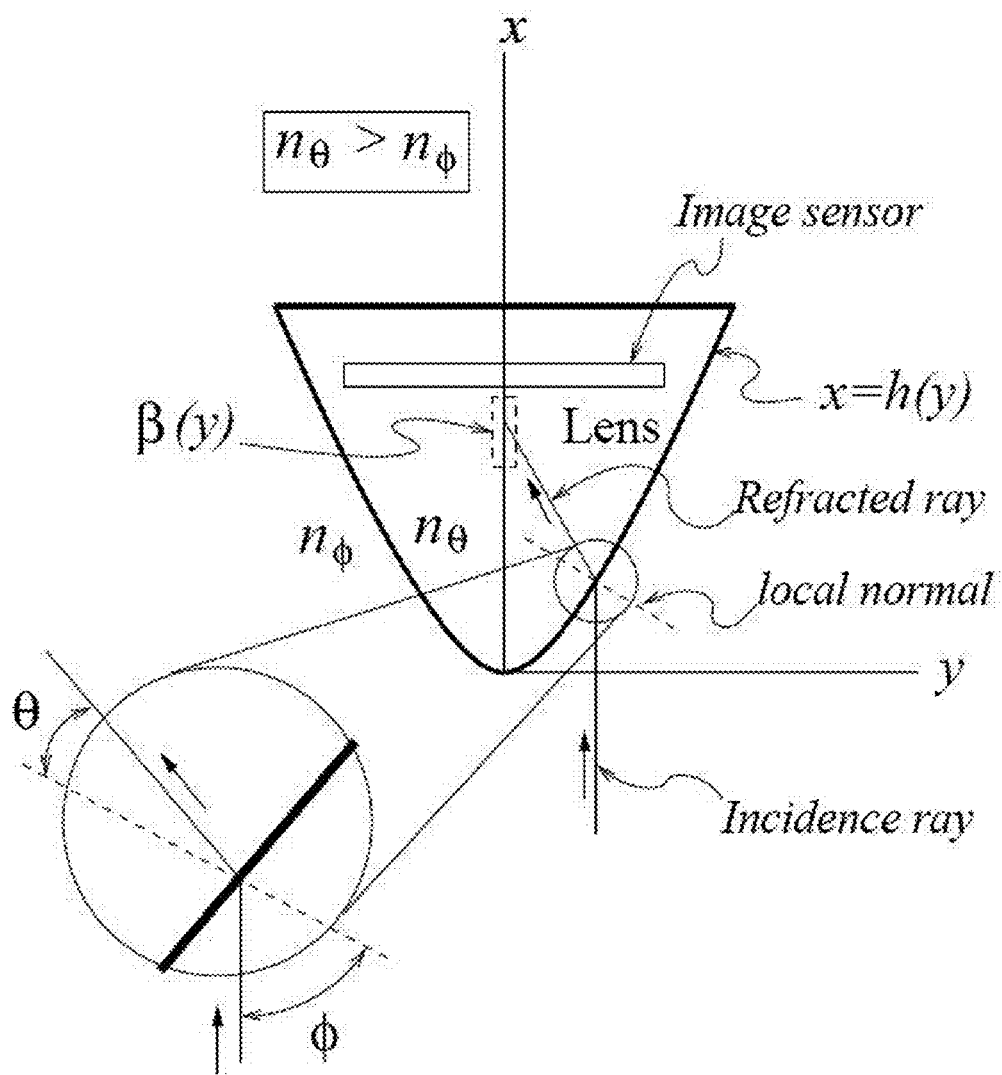
FIG. 10 is a diagram for explaining the location of the image sensor illustrated in FIG. 9.

FIG. 9 shows the coefficients of the above function by performing the linear regression at $n_\theta$=1.5311 and $n_\phi$=1, where a=−8×10$^{13}$, b=2×10$^{11}$, c=−1×10$^8$, d=52523, e=403.1, f=0.0003, and g=−3×10$^{-9}$. When $n_\theta$>$n_\phi$, the image sensor may be built in a medium with a refractive index of $n_\theta$ as shown in FIG. 10. A liquid lens may be applied as an example of the medium with a refractive index of $n_\theta$.

Figure 12:
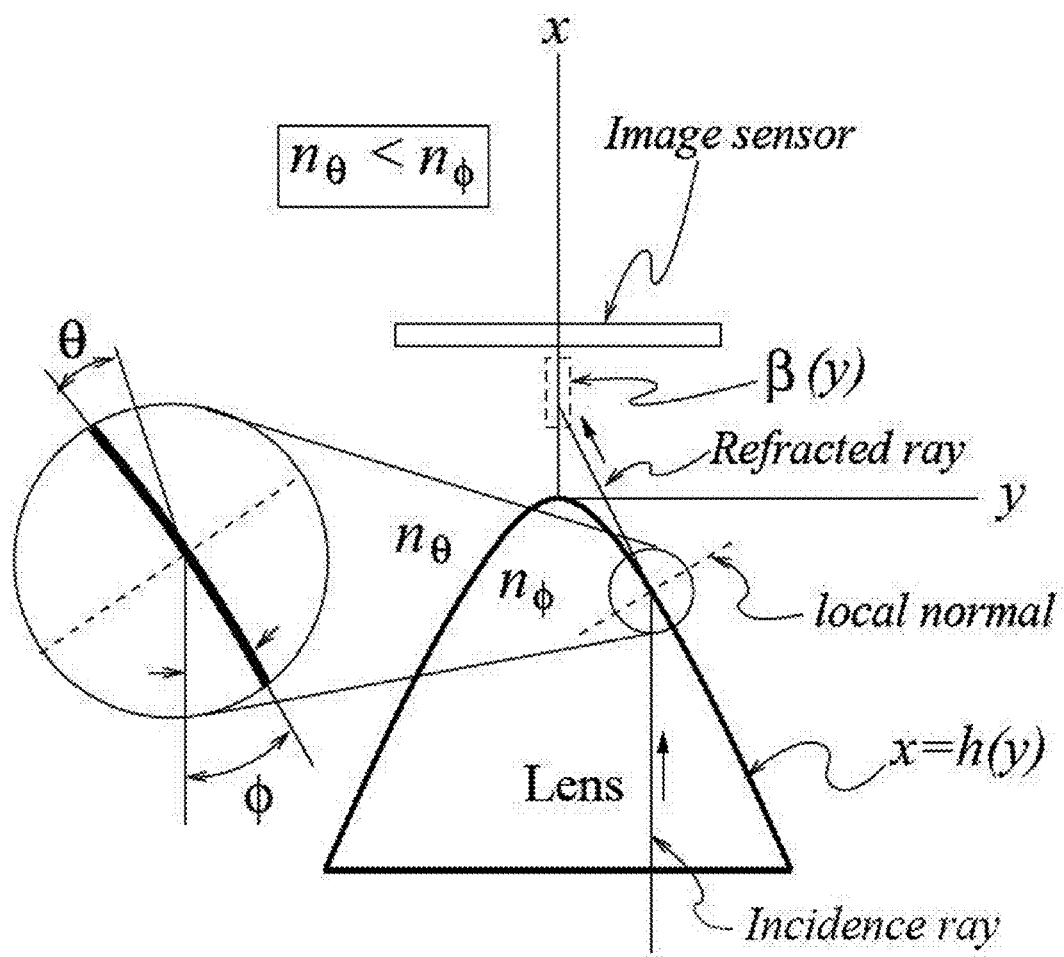
FIG. 12 is a diagram for explaining the location of the image senor illustrated in FIG. 11.

FIG. 11 is a diagram illustrating a situation where the values for $n_\theta$ and $n_\phi$ are reversed, i.e., $n_\theta$=1 and $n_\phi$=1.5311. Unlike the previous case, the light ray travels from the negative to the positive x direction, that is, it travels in the lens medium and exits to the air. An unshaded region in FIG. 10 represents the lens. The physical lens may be achieved by rotating the unshaded region about the x-axis. The following values of the coefficients of EQN. 12 were found by linear regression to best fit the data:

$a$=5×10$^{13}$, $b$=−1×10$^{11}$, $c$=1×10$^8$, $d$=−29916, $e$=−264,
$f$=−0.0002, and $g$=2×10$^{-9}$ FIG. 12 is a diagram illustrating a possible configuration for locating the image sensor where $n_\theta$<$n_\phi$.

The EDOF lens 120 may be implemented as an ophthalmic lens with a circular discontinuity on a border between lens layers, a diffraction optical element (DOE), or a correction element used with a general optical element, and the applicable types of lens are not limited thereto.

According to an aspect, the lens with an extended depth of focus and an optical system including the same generate a clear image of an object regardless of distance from the object.

Also, the lens may provide better symmetry, a simplified point spread function, a continuous lens surface, and a simple configuration, compared to the general lens.

Also, the lens may be configured by solving a simple differential equation by numerical analysis based on a depth of focus characteristic.

While a number of exemplary embodiments have been described above, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A lens with an extended depth of focus, comprising:
   a plurality of first lens layers, each of the plurality of the first lens layers located outside of a predetermined radius from an optical axis and focusing light onto a corresponding linear region formed a predetermined distance from both ends of a focal curve located on the optical axis; and a plurality of second lens layers located within the predetermined radius from the optical axis, wherein each of the plurality of the first lens layers and each of the plurality of the second lens layers is axially symmetric and a surface of each of the plurality of the first lens layers and each of the plurality of the second lens layers satisfies the equation:

$$\frac{dx}{dy} = \frac{y}{\beta_i - x - \frac{n_\phi}{n_\theta}\sqrt{(\beta_i - x)^2 + y^2}}, \; x(0) = 0,$$

wherein $n_\phi$, $n_\theta$ and $\beta_i$ represent a refractive index at an angle of incidence, a refractive index at an angle of refraction, and a focal length for i-th curved segments, respectively.

2. The lens of claim 1, wherein when refractive indices are $n_\theta=1.5311$ and $n_{\Phi=1}$, a cross-sectional curve of the lens is represented by:

$$x=ay^6+by^5+cy^4+dy^3+ey^2+fy+g,$$

where $a=-8\times10^{13}$, $b=2\times10^{11}$, $c=-1\times10^8$, $d=52523$, $e=403.1$, $f=0.0003$, and $g=-3\times10^{-9}$.

3. The lens of claim 1, wherein when refractive indices are $n_\phi=1.5311$ and $n_\theta=1$, a cross-sectional curve of the lens is represented by:

$$x=ay^6+by^5+cy^4+dy^3+ey^2+fy+g,$$

where $a=5\times10^{13}$, $b=-1\times10^{11}$, $c=1\times10^8$, $d=-29916$, $e=-264$, $f=-0.0002$, and $g=2\times10^{-9}$.

* * * * *